United States Patent
Oberg et al.

(10) Patent No.: US 9,422,966 B2
(45) Date of Patent: Aug. 23, 2016

(54) SHEAR MEMBER POST SHEAR SEGMENT RETENTION APPARATUS

(71) Applicant: Baker Hughes Incorporated, Houston, TX (US)

(72) Inventors: Levi B. Oberg, Houston, TX (US); Gregory L. Hern, Porter, TX (US); Jim H. Roddy, Houston, TX (US); Yingqing Xu, Tomball, TX (US); Douglas J. Lehr, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 525 days.

(21) Appl. No.: 13/791,412

(22) Filed: Mar. 8, 2013

(65) Prior Publication Data

US 2014/0251593 A1 Sep. 11, 2014

(51) Int. Cl.
*E21B 33/12* (2006.01)
*F16B 31/02* (2006.01)
*E21B 33/129* (2006.01)
*F16B 35/00* (2006.01)

(52) U.S. Cl.
CPC .............. *F16B 31/021* (2013.01); *E21B 33/129* (2013.01); *F16B 35/005* (2013.01)

(58) Field of Classification Search
CPC ................................ E21B 33/12; E21B 33/129
See application file for complete search history.

(56) References Cited

U.S. PATENT DOCUMENTS

| | | | | |
|---|---|---|---|---|
| 3,029,872 A * | 4/1962 | Hanes | | 166/63 |
| 4,102,153 A | 7/1978 | Stover et al. | | |
| 4,127,297 A * | 11/1978 | Dufrene | | E21B 31/18 |
| | | | | 294/86.18 |
| 4,545,431 A * | 10/1985 | Fore | | 166/123 |
| 5,086,839 A * | 2/1992 | Setterberg et al. | | 166/138 |
| 5,259,015 A | 11/1993 | Ohara et al. | | |
| 6,287,079 B1 | 9/2001 | Gosling et al. | | |
| 6,546,689 B1 | 4/2003 | Kim | | |
| 2008/0284637 A1* | 11/2008 | Blessing et al. | | 342/30 |
| 2009/0196708 A1* | 8/2009 | Stauch et al. | | 411/5 |
| 2012/0168178 A1* | 7/2012 | Eriksen et al. | | 166/382 |
| 2012/0279701 A1* | 11/2012 | Doane | | E21B 33/1291 |
| | | | | 166/217 |

OTHER PUBLICATIONS

Drawing, date unknown, 1 page.
BJ Services Company, Service Tools Technical Manual, BJ Plug Catcher, 2008 1 page.

* cited by examiner

*Primary Examiner* — William P Neuder
(74) *Attorney, Agent, or Firm* — Steve Rosenblatt

(57) ABSTRACT

Shear member designs in various formats are presented with additional features for segment retention and subsequent removal after a shearing event and removal of the tool from a subterranean location. In some embodiments a portion of the shear member is retained by threads so that the segment stays in the part and then can be removed at the surface with putting a notch in the segment and removing it with a screwdriver. In another embodiment a retaining pin in an intersecting bore can hold onto a sheared remnant of the shear pin by pushing the remnant laterally in the bore that it is mounted. Another design for a shear ring uses a split design with the right angle portion of the ring that gets sheared appearing in segments so that the ring can be rapidly snapped into a groove at its outer periphery followed by a retaining cap facilitating removal.

22 Claims, 3 Drawing Sheets

US 9,422,966 B2

SHEAR MEMBER POST SHEAR SEGMENT RETENTION APPARATUS

FIELD OF THE INVENTION

The field of the invention is shear members and more particularly devices that retain one or more segments of the shear member after a shearing event.

BACKGROUND OF THE INVENTION

Shear members are used to hold components together until a predetermined shear force is applied at which point the shear member fails by design. Shear members are frequently elongated cylindrical solid shapes or they can be annular hollow shapes such as a roll pin. Another variation for concentric members to hold them fixed against relative axial movement until a predetermined time is an l-shaped ring where one component is supported by the fixed member and the other portion of the l-shape is supported by the movable member. The shear location is generally at the vertex of the l-shape.

The problem with these designs apart from uncertainty regarding the amount of force that needs to be applied to cause them to fail is that post shear there are segments that can cause problems if for example there is not a clean break or if one of the segments after the shear comes out of the member to which it was initially mounted. Typically the shear members are inserted in a clearance or interference fit in aligned bores. In these situations, the segment can score the opposing member when the relative movement occurs. Equally as bad is that the segment can come loose and wedge the member trying to move with respect to its opposite member and a parts jam could result which disables a tool forcing at best an unnecessary trip out of the hole or even worse a potentially hazardous situation.

Various techniques have been used to mount shear pins as illustrated in U.S. Pat. Nos. 4,102,153; 6,287,079; 5,259,015 and 6,546,689.

The present invention seeks to address this issue in a subterranean context by employing simple structures that accomplish the intended purpose while at the same time taking up minimal space and facilitating rapid assembly. Means are provided in place of the clearance or interference fit used in the past of retaining at least one of the components internally in the respective bores in which the frangible member is disposed before the shear event. Those skilled in the art will better appreciate additional aspects of the invention from a review of the description of the preferred embodiments and the associated drawings while recognizing that the full scope of the invention is to be determined from the appended claims.

SUMMARY OF THE INVENTION

Shear member designs in various formats are presented with additional features for segment retention and subsequent removal after a shearing event and removal of the tool from a subterranean location. In some embodiments a portion of the shear member is retained by threads so that the segment stays in the part and then can be removed at the surface with putting a notch in the segment and removing it with a screwdriver. In another embodiment a retaining pin in an intersecting bore can hold onto a sheared remnant of the shear pin by pushing the remnant laterally in the bore that it is mounted. Another design for a shear ring uses a split design with the right angle portion of the ring that gets sheared appearing in segments so that the ring can be rapidly snapped into a groove at its outer periphery followed by a retaining cap facilitating removal.

DETAILED DESCRIPTION OF THE PREFERRED EMBODIMENT

Figure 1:
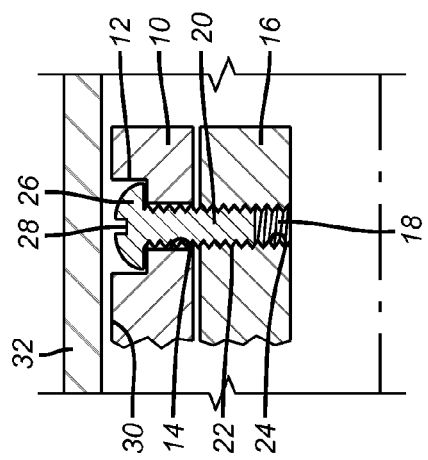
FIG. 1 is a section view of a shear screw threaded to a mandrel at one end and having a head in an external recess in a surrounding housing.

FIG. 1 shows a housing 10 having an exterior recess 12 and a bore 14 with a mandrel 16 having a bore 18 aligned with bore 14 for selectively securing the mandrel 16 to the housing 12. A shear or frangible screw 20 has threads 22 that thread into threads 24 in bore 18. Screw 20 has a rounded head 26 with a drive pattern such as slot 28 but other patterns such as Phillips, Allen or Torx are contemplated to drive the screw 20 into threads 24 in bore 18 of the mandrel 16. While the described parts are focused on a mandrel and a surrounding housing the invention is applicable to any pair of adjacent relatively moving parts with a preferred focus on tools used in a subterranean location. Head 26 preferably fits within recess 12 so that it does not extend beyond the outer wall 30 of the housing 10 where it can be damaged when running in or pulling out of a subterranean location such as on casing 32. In many instances the gap between wall 30 and casing 32 will be so small that the remnant 34 after a shear event shown in FIG. 2 will simply stay in the recess 12 and will not be able to back out or get wedged. It is important to note that after a shear event there is no threaded engagement to bore 14 that has a smooth wall.

Figure 3:
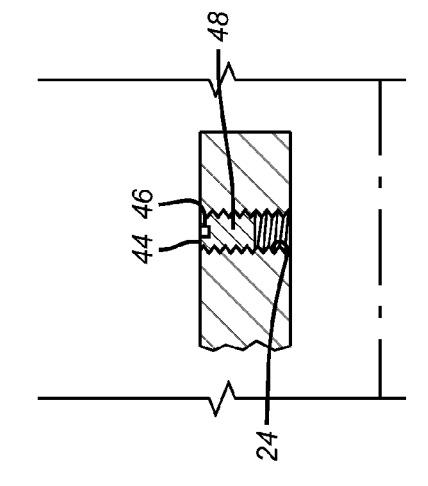
FIG. 3 is the view of FIG. 2 showing the mandrel after tool disassembly and the slot cut into the segment top to aid in its removal.

However, there may be situations where the gap between casing 32 and outer surface 30 is large enough so that there would be a risk of the remnant 34 coming out fully from bore 14 and recess 12 and in those cases provisions are envisioned for retention of segment 34 in bore 14 or in recess 12. One way to do this is to add a ratchet feature 36 to remnant 34 so that after a shear event the remnant is retained by a ratchet feature 38 added to bore 14. Another way to do this is to use an extending member 40 on a pivot 42 so that the member 40 can either be assembled last or swung out of the way of the screw 20 for installation and then swung back into position to prevent remnant 34 from exiting recess 12. The extending member can be in contact with the head 26 and act as a leaf spring to keep the remnant fully inserted into the bottom of the recess 12. FIG. 3 illustrates the mandrel 16 after the tool is brought to the surface and disassembled to expose end 44. At that time a groove 46 can be created by using a hacksaw or pounding a screwdriver blade into end 44 and turning the remnant 48 out of threads 24. Another way to get the remnant 48 is to drill into it in a direction that unthreads it.

Figure 5:
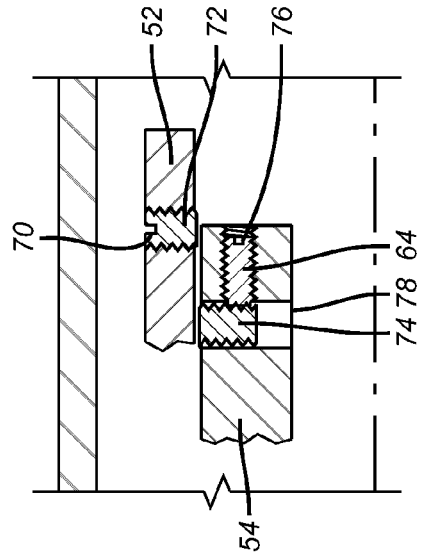
FIG. 5 is the view of FIG. 4 showing the sheared position with the retaining pin holding the sheared segment.
Figure 4:
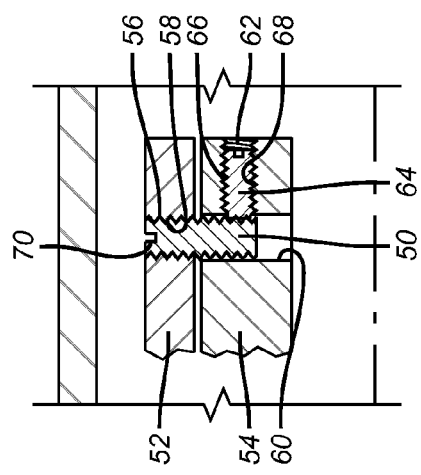
FIG. 4 is an alternative embodiment to FIG. 1 showing a pin with a top slot threaded into a surrounding housing while extending into a mandrel with a lateral bore holding a retaining pin.

FIGS. 4 and 5 illustrate a way to hold a shear member 50 to a housing 52 and a mandrel 54. The shear member has threads 56 that engage threads 58 in the housing 52. Bore 60 in mandrel 54 is not threaded and there is a loose fit in bore 60 by the shear member 50. Mandrel 54 also has an intersecting bore 62 that holds set screw 64 that has threads 66 that engage threads 68 in bore 62. Slot or other profile 70 is used to drive in shear member 50 and after removal and disassembly on the surface to remove remnant 72 from the housing 52. Remnant 74 is retained in bore 60 due to the lateral push from set screw 64. Upon removal from a subterranean location and disassembly, the remnant 74 is removable by rotation applied to profile 76 by a proper tool. In a variation the shear member 50 can have threads in the portion passing into housing 52 or no threads at all and a ratchet on remnant 74 so that in the FIG. 5 position the intersecting bore can be dispensed with and the remnant 74 after the shearing event and disassembly can simply be pushed out end 78. If there were no threads on the shear member 50 in housing 52 then the ratchet in the mandrel 54 could hold the set position with simply a push in force without the need for rotation.

Figure 2:
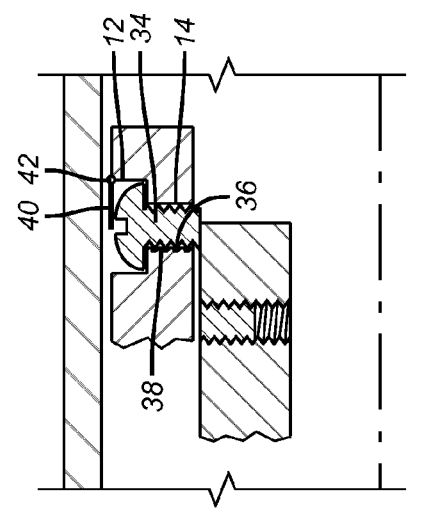
FIG. 2 is the view of FIG. 1 with the screw sheared.
Figure 8:
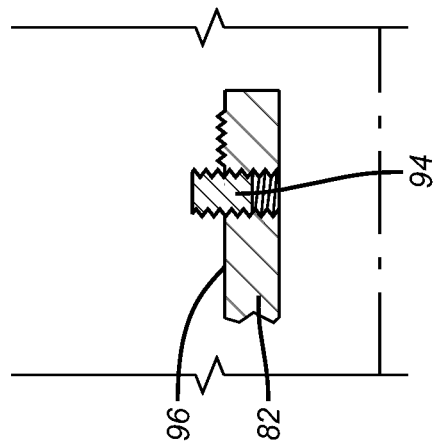
FIG. 8 is the view of one remnant after the shear of FIG. 7.
Figure 7:
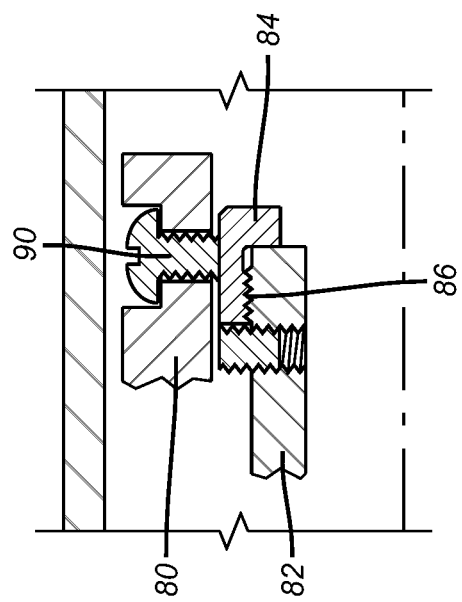
FIG. 7 is the view of FIG. 6 in the sheared position.
Figure 6:
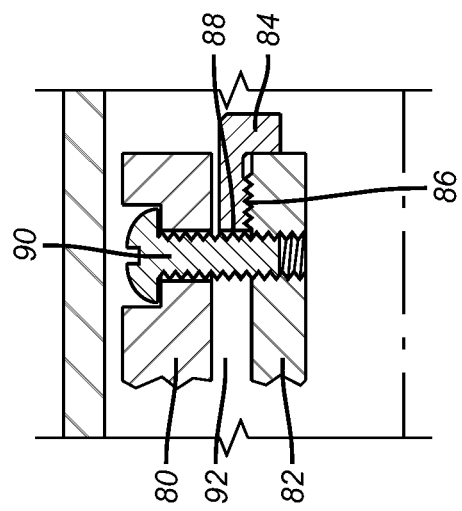
FIG. 6 is an alternative design to FIG. 1.

FIGS. 6-8 represent another embodiment similar to FIGS. 1-3 with the exception that there is a bigger gap between the housing 80 and the mandrel 82 to make room for threaded ring 84 that is secured at threads 86 an has an end 88 that extends close to shear member 90. In essence gap 92 is filled by ring 84 so that on a shearing event the shear on shear member 90 happens between the outer surface of ring 84 and the inner surface of the housing 80. After removal from the subterranean location and disassembly of the ring 84 from the mandrel 82 the remnant 94 is now accessible beyond surface 96 an can be gripped with a hand drill chuck assembly or even vise grips for easy removal by rotation.

Figure 9:
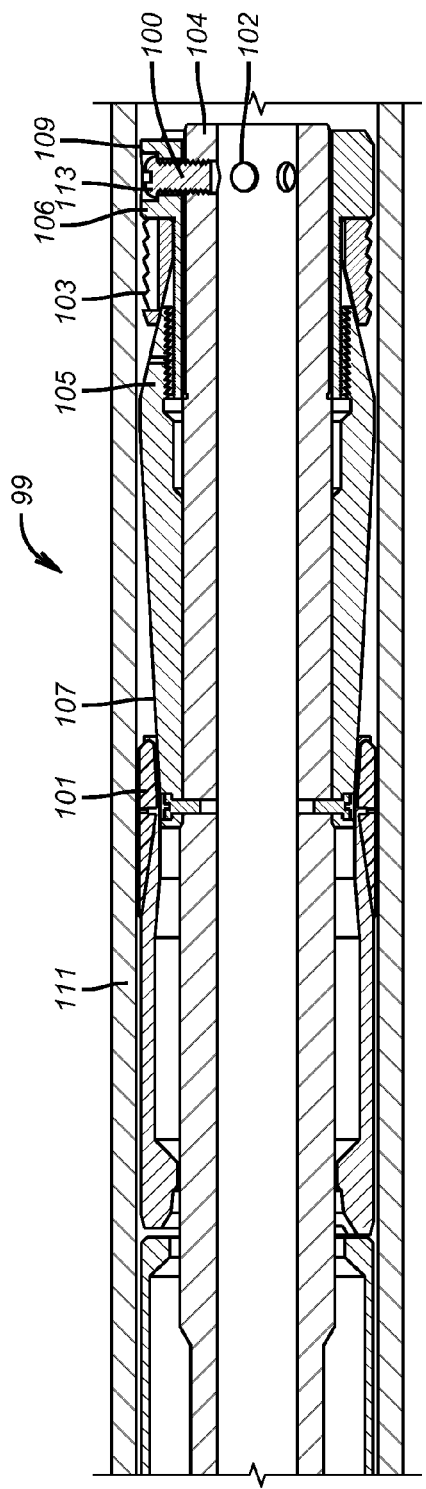
FIG. 9 is a section view of a shear pin for a tubular plug extending from a housing into a corresponding opening in a concentric mandrel with a close clearance to the surrounding tubular to hold a head of the shear member to the plug body after a shear event.

FIG. 9 illustrates one or more shear pins 100 that extend from housing 106 through openings 102 in a mandrel 104. In this application a downhole plug 99 with a seal 101 and slips 103 that can be extended with axial compression using ramps such as 105 and 107. An outer surface 109 is a close fit inside a surrounding tubular 111 so that after a shear event the head 113 cannot escape out of the outer component 106 because there is insufficient clearance by design so that component of the shear or frangible member 100 will not fall into the well. The other component can be retained by the inner component 104. This design is intended to stay in a well for a long time before being released or drilled to release and the concern is the loss of part of the frangible member 100 that rides with the outer component 106. A thread or ratchet can hold the sheared portion of the frangible member 100 to the inner component 104. As a backup, the head 113 can be held in position by a retainer such as 40 shown in FIG. 2. The shear event sets the plug as the mandrel or inner component 104 is removed. This leaves an exposed seat that accepts an object such as a ball to close the passage through the now set plug.

Figure 11:
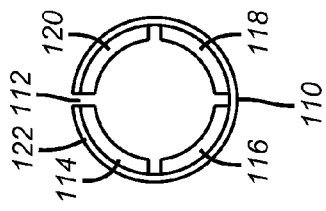
FIG. 11 is an end view of the split l-shaped shear ring of FIG. 2.
Figure 10:
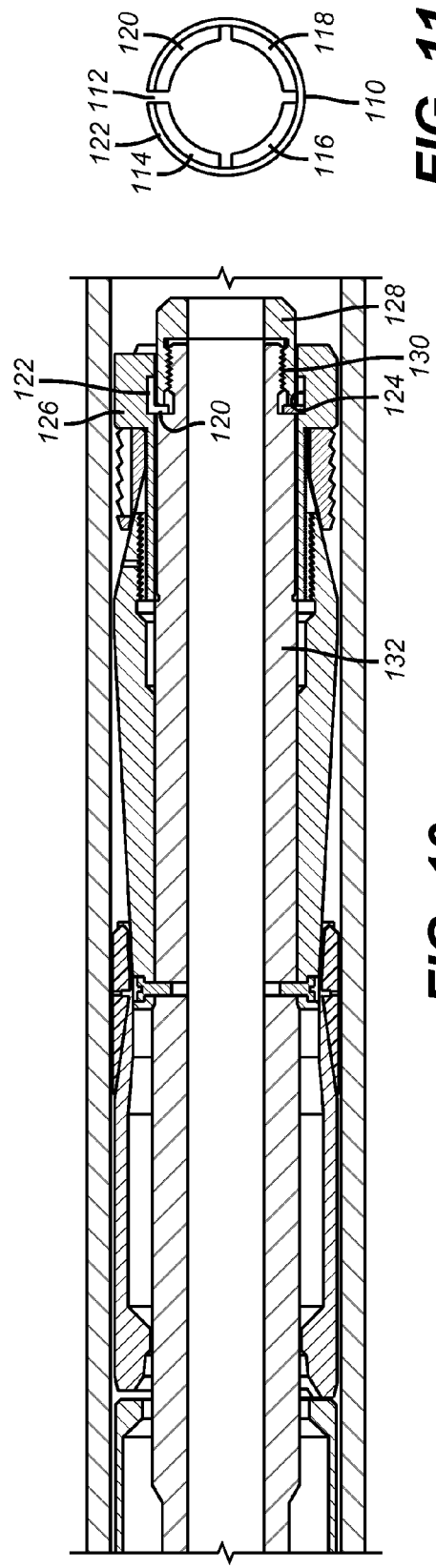
FIG. 10 is an alternative design to the FIG. 1 design with a split l-shaped shear ring with segments to facilitate installation with flexing and a readily removable retaining nut.

FIGS. 10 and 11 illustrate the use of a split l-shaped ring 110 that in the unassembled state has a gap 112. Segments 114, 116, 118 and 120 are preferably in a plane perpendicular to the outer ring 122 that is designed to fit into groove 124 of housing 126. The presence of the split 112 and gaps between segments 114, 116, 118 and 120 allow the outer ring 122 to flex to a smaller dimension for insertion into the groove 124 followed by a snap action outward on release for fixation into groove 124 with a residual net retaining potential energy force. Ring 128 is then threaded to threads 130 on mandrel 132 to lend support to segments 114, 116, 118 and 120. Relative movement of the mandrel 132 and the housing 126 shears off most of segments 114, 116, 118 and 120 from ring 122 along a shear line with ring 128 holding those remnants to the mandrel 132 until the tool can be removed for disassembly by unthreading ring 128 to remove outer ring 122.

Those skilled in the art will appreciate that a variety of solutions are offered for retention of a sheared off remnant at the end opposite from the direction in which the shear member is installed. In the case of the shear ring a flexible structure that allows rapid installation and retention in position is combined with a ring structure that defines the shear failure location and retains the remnant while making the ultimate removal simpler with a removal of a threaded sleeve. Those skilled in the art will appreciate that a variety of tools can be used with the illustrated designs and that components can be reversed while still achieving the goal of keeping parts together until a predetermined force is applied to one of the components while the other is held fixed. The material of the shearing members can be selected to achieve the desired resistance to net force and compatibility with well conditions.

The above description is illustrative of the preferred embodiment and many modifications may be made by those skilled in the art without departing from the invention whose scope is to be determined from the literal and equivalent scope of the claims below:

We claim:

1. A frangible retention system for a plug for a borehole defined by a tubular wall at a subterranean tool, comprising:
   inner and outer relatively movable components;
   a selectively movable seal and gripping member mounted to an outer surface of said outer component;
   a frangible member spanning between and into said movable components, said frangible member having a head disposed within an opening on said outer surface of said outer component, said outer surface disposed sufficiently close to the tubular wall to prevent escape of a portion of the frangible member created by failing due to relative component movement that sets said seal and gripping member against the tubular wall.

2. The system of claim 1, further comprising:
   a retention device engaging said frangible member supported by at least one of said components.

3. The system of claim 2, further comprising:
   said retention device comprises engaged threads on said frangible member and a surrounding said component.

4. The system of claim 2, wherein:
   said retention device for said frangible member comprising a thread connection to said frangible member in a bore in said inner component.

5. The system of claim 4, wherein:
   said frangible member does not contact a bore on said outer component.

6. A frangible retention system for a plug for a borehole defined by a tubular wall at a subterranean tool, comprising:
   inner and outer relatively movable components;
   a selectively movable seal and gripping member mounted to an outer surface of said outer component;
   a frangible member spanning between and into said movable components, said frangible member having a head disposed within an opening on said outer surface of said outer component, said outer surface disposed sufficiently close to the tubular wall to prevent escape of a portion of the frangible member created by failing due to relative component movement that sets said seal and gripping member against the tubular wall;

a retention device engaging said frangible member supported by at least one of said components;

said retention device comprises a fastener in an intersecting bore to a frangible member bore and extending into said frangible member bore to retain said frangible member.

7. The system of claim 6, wherein:
said intersecting bore is perpendicular to said frangible member bore and is threaded to retain said fastener against said frangible member.

8. A frangible retention system for a plug for a borehole defined by a tubular wall at a subterranean tool, comprising:
inner and outer relatively movable components;
a selectively movable seal and gripping member mounted to an outer surface of said outer component;
a frangible member spanning between and into said movable components, said frangible member having a head disposed within an opening on said outer surface of said outer component, said outer surface disposed sufficiently close to the tubular wall to prevent escape of a portion of the frangible member created by failing due to relative component movement that sets said seal and gripping member against the tubular wall;
a retention device engaging said frangible member supported by at least one of said components;
said retention device comprises a ratchet assembly allowing movement in one direction for insertion of said frangible member into contact with said components.

9. The system of claim 8, wherein:
said retention device allows installation of said frangible member without rotation.

10. A frangible retention system for a plug for a borehole defined by a tubular wall at a subterranean tool, comprising:
inner and outer relatively movable components;
a selectively movable seal and gripping member mounted to an outer surface of said outer component;
a frangible member spanning between and into said movable components, said frangible member having a head disposed within an opening on said outer surface of said outer component, said outer surface disposed sufficiently close to the tubular wall to prevent escape of a portion of the frangible member created by failing due to relative component movement that sets said seal and gripping member against the tubular wall;
a retention device engaging said frangible member supported by at least one of said components;
said retention device engaging two remnants of said frangible member formed as a result of component relative movement and at both said components.

11. The system of claim 10, wherein:
said head is disposed in a recess in said outer component retained by a retainer in said recess;
said frangible member retained to said inner component by engaged threads in a bore of said inner component.

12. A frangible retention system for a plug for a borehole defined by a tubular wall at a subterranean tool, comprising:
inner and outer relatively movable components;
a selectively movable seal and gripping member mounted to an outer surface of said outer component;
a frangible member spanning between and into said movable components, said frangible member having a head disposed within an opening on said outer surface of said outer component, said outer surface disposed sufficiently close to the tubular wall to prevent escape of a portion of the frangible member created by failing due to relative component movement that sets said seal and gripping member against the tubular wall;
said frangible member is sheared to form two remnants with said remnant retained in an inner component removable by creating a recess in an exposed end of said remnant in said inner component and turning said remnant with a tool inserted in said recess.

13. A frangible retention system for a subterranean tool, comprising:
an inner and outer relatively movable components;
a frangible member spanning said components to hold said components together until failed;
said frangible member further comprising a ring shape further comprising a peripheral circular dimension that can be reduced by flexing to facilitate mounting into a circular groove to a surrounding one of said components upon release of said flexing.

14. A frangible retention system for a subterranean tool, comprising:
an inner and outer relatively movable components;
a frangible member spanning said components to hold said components together until failed;
said frangible member further comprising an annular shape further comprising a peripheral dimension that can be reduced by flexing to facilitate mounting to one of said components upon release of said flexing;
a retention device mounted to the other component from where said frangible member is mounted and defining a peripheral dimension that defines a failure line for said frangible member.

15. The system of claim 14, wherein:
said retention device comprises a removable ring extending between said components and removably supported by one of said components.

16. The system of claim 15, wherein:
said frangible member has an L-shaped cross section.

17. The system of claim 15, wherein:
said ring is connected by threads to an inner said component that said ring surrounds, whereupon after said frangible member is failed and said ring is removed, a remnant that extends radially from said inner component is presented that is at least in part still removably retained to said inner component.

18. The system of claim 15, wherein:
said ring is connected by threads to an inner said component that said ring surrounds, whereupon after said frangible member is failed and said ring is removed, the remnant that is formed that was previously retained by said ring is no longer supported by said inner component.

19. The system of claim 16, wherein:
said frangible member comprised a split ring with abutting or overlapping ends.

20. The system of claim 16, wherein:
said frangible member comprises an outer ring that is split and segments in an intersecting plane.

21. The system of claim 20, wherein:
said outer component has a groove to accept said outer ring.

22. The system of claim 20, wherein:
said split allows insertion of said outer ring into said groove with a resulting net force on said outer ring to retain said outer ring in said groove.

* * * * *